(12) United States Patent
Doering

(10) Patent No.: US 12,184,745 B2
(45) Date of Patent: Dec. 31, 2024

(54) METHOD FOR CONFIGURING QUALITY-OF-SERVICE QUANTITIES IN A NETWORK HAVING A FIRST NETWORK SEGMENT AND MULTIPLE SECOND NETWORK SEGMENTS INCLUDING MULTIPLE NETWORK SUBSCRIBERS

(71) Applicant: Robert Bosch GmbH, Stuttgart (DE)

(72) Inventor: Michael Ernst Doering, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/302,411

(22) Filed: Apr. 18, 2023

(65) Prior Publication Data
US 2023/0388396 A1 Nov. 30, 2023

(30) Foreign Application Priority Data
May 31, 2022 (DE) ...................... 10 2022 205 518.7

(51) Int. Cl.
*H04L 67/61* (2022.01)
(52) U.S. Cl.
CPC .................................. *H04L 67/61* (2022.05)

(58) Field of Classification Search
None
See application file for complete search history.

(56) References Cited

U.S. PATENT DOCUMENTS

| 9,565,272 B2 * | 2/2017 | Momtahan | ............. | H04L 47/70 |
| 2021/0099905 A1 * | 4/2021 | Huang | ............. | H04W 28/0215 |

* cited by examiner

*Primary Examiner* — William G Trost, IV
*Assistant Examiner* — Christopher P Cadorna
(74) *Attorney, Agent, or Firm* — NORTON ROSE FULBRIGHT US LLP; Gerard A. Messina

(57) ABSTRACT

A method for configuring quality-of-service quantities in a network including a first network segment has a first gateway as a network subscriber and each of multiple second network segments has a second gateway as a network subscriber. The first gateway and the second gateways are logically set up in a tree structure having multiple stages. Each gateway in a stage is connected in a data-conducting manner to precisely one gateway in a stage situated below. The first gateway forms the lowest stage. Each gateway makes a quality-of-service quantity available for the forwarding of data. The method includes: an addressed gateway receiving a quality-of-service request from a requesting network subscriber; checking whether the addressed gateway has a sufficient free quality-of-service quantity; if not, rejecting the quality-of-service request by a negative reply; if so, forwarding the quality-of-service request to the gateway in the stage situated below.

12 Claims, 5 Drawing Sheets

METHOD FOR CONFIGURING QUALITY-OF-SERVICE QUANTITIES IN A NETWORK HAVING A FIRST NETWORK SEGMENT AND MULTIPLE SECOND NETWORK SEGMENTS INCLUDING MULTIPLE NETWORK SUBSCRIBERS

CROSS REFERENCE

The present application claims the benefit under 35 U.S.C. § 119 of German Patent Application No. DE 10 2022 205 518.7 filed on May 31, 2022, which is expressly incorporated herein by reference in its entirety.

FIELD

The present invention relates to a method for configuring quality-of-service quantities in a network having a first network segment and multiple second network segments, each including multiple network subscribers in each case, and it relates to a processing unit and a computer program for its execution.

BACKGROUND INFORMATION

In vehicle computers (central processing unit in a vehicle; 'vehicle computer'), subsets of tasks or processes are assigned to subsets of resources such as memories, processor cores or processor cycles and thereby combined into what is known as domains. For instance, this assignment is guided by the functional safety requirements in the sense of ISO 26262. In the following text, this will also be referred to by the term 'safety' or 'IT security'. Its goal is to separate the critical from the non-critical processes as best as possible. This is meant to prevent a malfunction in a non-critical process from affecting a critical process.

For instance, processes for automatic driving functions should be separated from processes that require an Internet access such as a search for a parking space via a cloud-based backend, so that the vehicle behavior is unable to be affected by the internet even in the event of malfunctions.

To enable a controlled communication between the domains, so-called bridging devices or gateways are employed, which may be developed both as a hardware unit and a software process. In general, gateways are units which connect two networks—domains in this case—with one another. These gateways filter the communication and allows only certain "safe" messages or value ranges to pass between the domains, for example.

SUMMARY

According to the present invention, a method is provided for configuring quality-of-service quantities in a network having a first network segment and multiple second network segments, which have multiple network subscribers in each case as well as a processing unit and a computer program for its execution. Advantageous embodiments and refinements of the present invention are disclosed herein.

The present invention allows for the management, assurance and implementation of quality-of-service guarantees (QoS) for the communication between computer programs ('software components', 'services'), which—distributed across multiple subsystems (processors, operating systems, partitions, virtual machines, containers, etc.)—interact; the subsystem may be characterized by having different quality-of-service capabilities ('domains') and being (at least partly) decoupled (isolated) from one another in order to avoid undesired retroactive effects.

For instance, an orderly inter-domain communication (in compliance with end-to-end guarantees) is able to be carried out within a vehicle computer with multiple domains using a secure gateway which permits fine-grained configurable accesses from all QM domains to a subset of services/fields/functions in the safety domain. The present invention bundles the different communication relations into a tree-shaped overlay network, so that the efficiency is increased and the decentralized-autonomous management of QoS budgets on a logic model of the overlay network is possible.

Within the framework of the present invention, a method is introduced for configuring quality-of-service quantities in a network. According to an example embodiment of the present invention, gateways in different network segments are logically set up in a tree structure having multiple stages, each gateway in a stage being connected in a data-conducting manner to precisely one gateway in a stage situated below, the first gateway forming the first stage. Each gateway supplies a quality-of-service quantity for the forwarding of data. In the method, an addressed gateway receives a quality-of-service request from a requesting network subscriber, checks whether it has a sufficient free quality-of-service quantity to satisfy the quality-of-service request, and if the addressed gateway does not have a sufficient free quality-of-service quantity to satisfy the quality-of-service request, it rejects the quality-of-service request by a negative reply. At least in a case in which the addressed gateway has a sufficient free quality-of-service quantity to satisfy the quality-of-service request, the quality-of-service request is forwarded to the gateway in the stage situated below, and a positive reply that a sufficient free quality-of-service is available to satisfy the quality-of-service request, or a negative reply that no sufficient free quality-of-service quantity is available to satisfy the quality-of-service request is received from the gateway in the stage situated below. If the addressed gateway has a sufficient free quality-of-service quantity to satisfy the quality-of-service request, then the (positive or negative) reply is forwarded to the requesting network subscriber. If the addressed gateway has a sufficient free quality-of-service quantity available to satisfy the quality-of-service request and the reply by the gateway in the stage situated below is positive, the requested quality-of-service quantity is allocated to the requesting network subscriber, that is, reserved in the gateway, so that it is unable to be used for other requests.

The present invention manages the reservation and configuration of the forwarding functions of the gateway using the technical effect that the messages are influenced with regard to their communication paths and the time behavior, so that certain QoS requests able to be satisfied or be guaranteed at a certain quality, for instance in order to guarantee the functional safety of sensor-actuator effect chains, for instance. Examples of QoS characteristics/criteria are a latency, jitter, priority, periodicity, transmission capacity or data quantity per time unit, delivery guarantee, source redundancy, path redundancy, receiver availability detections, message persistence (buffer memory if the receiver is unavailable), guaranteed retaining of sequences, data freshness/age until an expiration/invalidity.

An (e.g., monetary) accounting/offsetting of the resource use is possible as well, and/or what is known as 'smart contracts' can be used.

Generally, the gateways are embodied as virtual gateways in so-called software-defined architectures, but they interact with physical gateways and are also able to be implemented in (or on) hardware themselves.

The connected domains are usually situated inside a vehicle. However, a linkage of mobile devices of the vehicle passengers or of external devices (roadside units, external servers, edge/cloud, etc.), for instance, is not excluded.

The method operates in a decentralized fashion, which is advantageous for a fail-safe operation. In addition, the method is able to be supplied with centrally managed data, e.g., with regard to the network topology, and alternatively (or only temporarily, for example, or only when available) be controlled by a logically centralized administration entity (e.g., an SDN controller, container orchestrator, hypervisor, OEM server, etc.).

A processing unit according to the present invention, e.g., a gateway of a vehicle, is designed, especially in terms of its program technology, to execute a method according to the present invention.

Also advantageous is the implementation of a method according to the present invention in the form of a computer program or a computer program product having program code to execute all of the method steps since this entails an especially low expense, in particular when an executing control device is also used for other tasks and is therefore installed anyway. Finally, a machine-readable memory medium is provided having a computer program stored thereon, as described above. In particular, suitable memory media or data carriers for providing the computer program are magnetic, optic and electric memories such as hard disks, flash memories, EEPROMs, DVDs, and others. A download of a program via computer networks (Internet, Intranet etc.) is also an option. Such a download may be conducted by wire or in a wireless manner (e.g., via a WLAN network, a 3G, 4G, 5G or 6G connection, etc.).

Additional advantages and embodiments of the present invention result from the description and the figures.

The present invention is schematically illustrated in the figures based on an exemplary embodiment and will be described below with reference to the figures.

DETAILED DESCRIPTION OF EXAMPLE EMBODIMENTS

Figure 1:
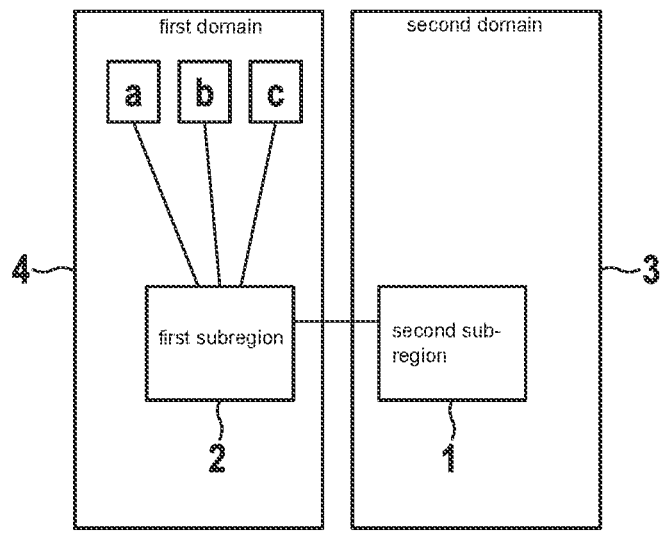
FIG. 1 shows a schematic representation of a method for transmitting data in a network which has different security requirements and is not developed according to an example embodiment of the present invention.

In FIG. 1, a subdivision of a network, not developed according to the present invention, into two network segments (domains) that have different security requirements and the connection of the domains with the aid of a so-called secure gateway is schematically illustrated. A secure gateway 1, 2 has two subregions, which are situated in different domains 3, 4 in this case. First subregion 1 of secure gateway 1, 2 is situated in a first domain 3 which, for example, must satisfy higher demands in terms of the functional security, and is decoupled therefrom via second subregion 2 of secure gateway 1, 2, which is situated in a second domain 4. Shown above second subregion 2 of secure gateway 1, 2 are software components a to c, which are to communicate via the secure gateway with software components (not shown in FIG. 1) in first domain 3.

Resource groups, in particular, are able to be mapped or defined as network segments, and a communication beyond resource-group boundaries takes place between elements of different resource groups. A resource group may be understood as a subset of processing units/resources ($\mu C$, $\mu P$/CPU, memories, I/O-interfaces, . . . ), which make certain finite processing capacities available, and software components which occupy these resources and satisfy certain quality-of-service properties in the process, which usually depend on the availability of the processing capacities. A combination/grouping of processing resources and software components/function groups may often result from technical demands, properties and solution approaches. In a vehicle, for instance, an infotainment domain, a powertrain domain, a driver-assistance domain, and others may be defined. Domains often differ significantly in terms of their requirements and properties, e.g., IT security, functional safety, software/life cycles/updating capability, etc.

The resource groups are at least partly decoupled from one another or isolated by gateways (bridging devices), which allow only certain parts of the communication to pass through.

In particular parts of an automotive interdomain gateway essentially developed in software are able to be used as gateways. They are usually subdivided into two function groups, one of which in each case being implemented in the two domains connected by the gateway.

Figure 2:
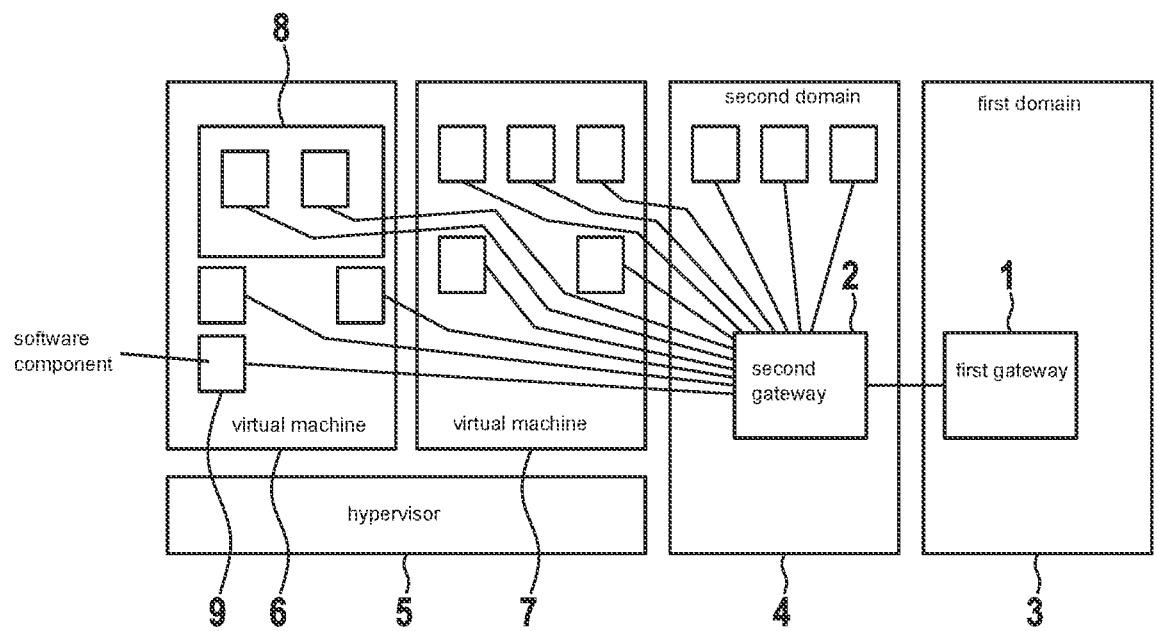
FIG. 2 schematically shows an expansion of the system illustrated in FIG. 1 to a system having multiple domains.

In FIG. 2, the subdivision shown in FIG. 1 is expanded to a system having five domains 3 to 7. For example, the additional domains may be further partitions of a vehicle computer, partitions of a remote system linked with the aid of an automotive ethernet, for example, virtual machines 6 and 7 operated by a hypervisor 5, or a combination of the above-mentioned embodiments. These domains 3 to 7 may internally be subdivided into additional subdomains 8, e.g., into further virtual machines or containers. It may be gathered from FIG. 2 that a further logic connection results for each additional software component 9 that communicates by way of gateway 2. With an increasing number of connections, this therefore results in a greater memory and calculation outlay at gateway 2, especially when quality-of-service mechanisms (QoS) are used, because a complex resource management has to be calculated for each logic connection. In other words, the system does not scale well because every further connection imposes a greater load on gateway 2.

A special gateway structure according to the present invention, of which a preferred embodiment will be described in the following text with reference to FIGS. 3 to 6, is now provided as an improvement to such a structure. However, the explanations in connection with the structural and IT bases and the terms of FIGS. 1 to 2 apply in the same way in this case.

Figure 3:
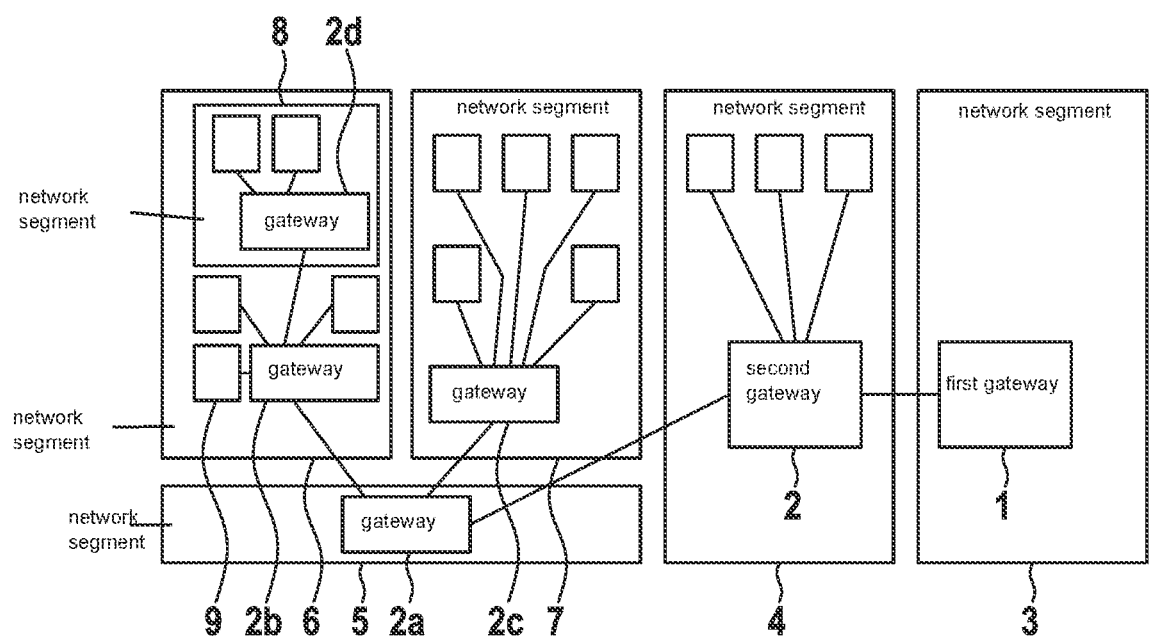
FIG. 3 shows a schematic representation of the method of the present invention in an advantageous embodiment of the present invention.

FIG. 3 shows a network 10 having multiple network segments 3 to 7, a first network segment 3 having a first gateway 1 as a network subscriber, and second network segments 4 to 7 having second gateways 2, 2a to 2d as network subscribers. First gateway 1 and second gateways 2, 2a to 2d are logically situated in a spatial structure featuring multiple stages, the first gateway 1 forming the lowest stage, and each gateway in a stage being connected in a data-transmitting manner to precisely one gateway in a stage situated below. More specifically, gateway 2d is connected to gateway 2b, gateways 2b and 2c are connected to gateway 2a, gateway 2a is connected to gateway 2, which in turn is connected to gateway 1 in the lowest stage.

Multiple logic tree structures may be defined in a network, which are logically separated but may physically overlap. Gateways 1, 2, 2a to 2d are connected with the aid of communication technologies which basically support the implementation of QoS mechanisms (or already offer their configuration by standard), e.g., CAN, (automotive) ethernet, virtual ethernet, TSN, SDN, etc.

Each gateway 1, 2, 2a to 2d makes a certain quality-of-service quantity available for the forwarding of data and carries out typical conventional gateway functions during the operation such as the forwarding (or also filtering) of PDUs (PDU=Protocol Data Units, 'messages' in short). Also conventional are methods for the reconfiguration of a gateway, e.g., of forwarding tables in an automotive ethernet, of schedules in TSN or of blacklist/whitelists for filtering CAN messages. In the process, especially also reconfiguration messages (RCM) are exchanged, which trigger a reconfiguration using the parameters and/or rules included by the message. The forwarding behavior and the time behavior of the forwarding are influenced as a result. In other words, depending on the resources and QoS demands, additional or other PDUs are able to be forwarded between the logic inputs and outputs of the subgate system. An RCM is generated in particular in method steps 410 and 507 (see below).

As already described in connection with FIG. 1, it is to be assumed that first gateway 1 is situated in a network segment 3 which must satisfy certain demands on the functional security and for that reason should be decoupled from the remaining network segments 4 to 7. It may be gathered that the number of logic connections originating from gateway 2 has been considerably reduced in comparison with the system according to FIG. 2 not developed according to the present invention. More specifically, in network 10 according to FIG. 3, only four logic connections are now linked to gateway 2, whereas 15 logic connections are linked to gateway 2 in the network in FIG. 2. This reduction in the number of logic connections stems from the fact that in network 10 according to FIG. 3, each network segment 5, 6, 7 is likewise equipped with one (or more) gateways which form logic connections there and in turn are connected to the stage below by only a single logic connection. These additional gateways (which may also be referred to as subgateways) may be developed both in hardware and software, in particular be implemented as a supplementary function to already existing hardware or software.

A network according to a preferred embodiment of the present invention as shown in FIG. 3, for example, scales considerably better than a network shown in FIG. 2 when further components are added in additional network segments.

For example, two gateways 2b and 2d are included in the network segment by way of example, gateway 2d being embodied in such a way that it behaves like a typical software component 9 from the standpoint of gateway 2b, whereas gateway 2b behaves like a conventional gateway (e.g., 1) from the standpoint of gateway 2b. In this way, a further network segment 8, which has its own gateway 2d, is able to be encapsulated in network segment 6.

Each gateway 2a to 2d may connect to first gateway 1 or a second gateway. From the standpoint of a directly following second gateway (e.g., 2b or 2c), the directly upstream second gateway (e.g., 2a) behaves like the lowest second gateway 2. Second gateways may thus be linked or cascaded. A software component (e.g., 8), which registers at a second gateway in order to use QoS resources, employs the same methods that are also used by the second gateways for a connection to each other. Thus, from the standpoint of the second gateway, it is also unimportant whether another second gateway or a software component is connecting. This method is advantageous because it considerably reduces the complexity so that QoS administration and calculation methods are able to be carried out more efficiently in terms of the runtime and the required memory.

Figure 4:
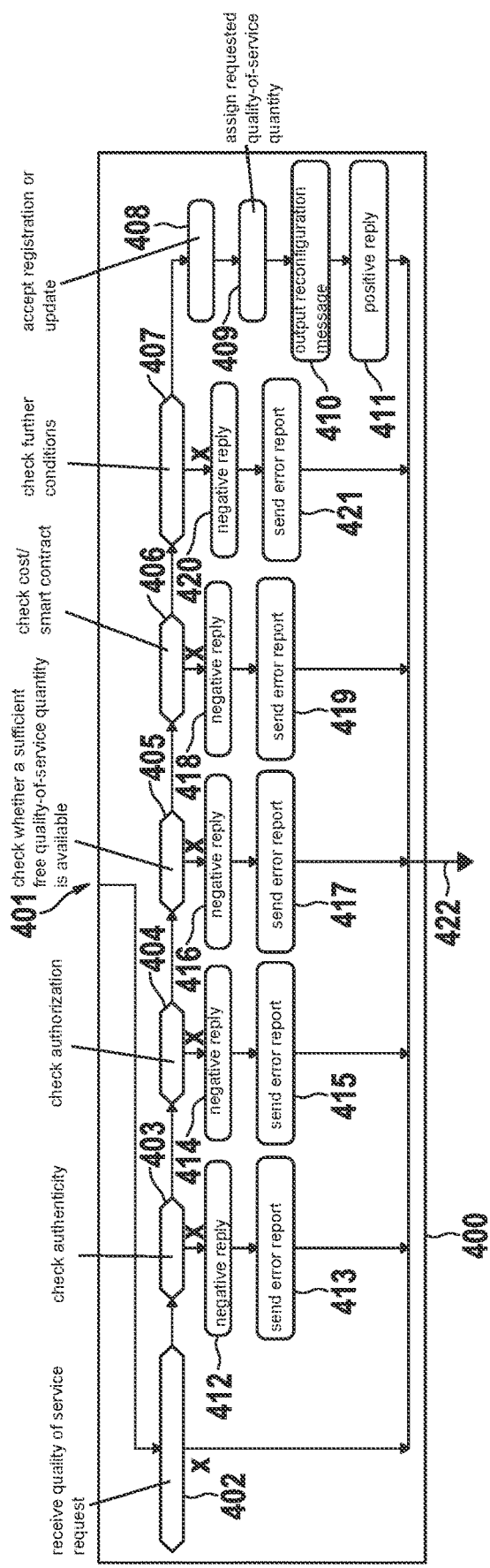
FIG. 4 shows the sequence of the method steps of the function block for registering/updating a quality-of-service quantity from FIG. 3, according to an example embodiment of the present invention.
Figure 5:
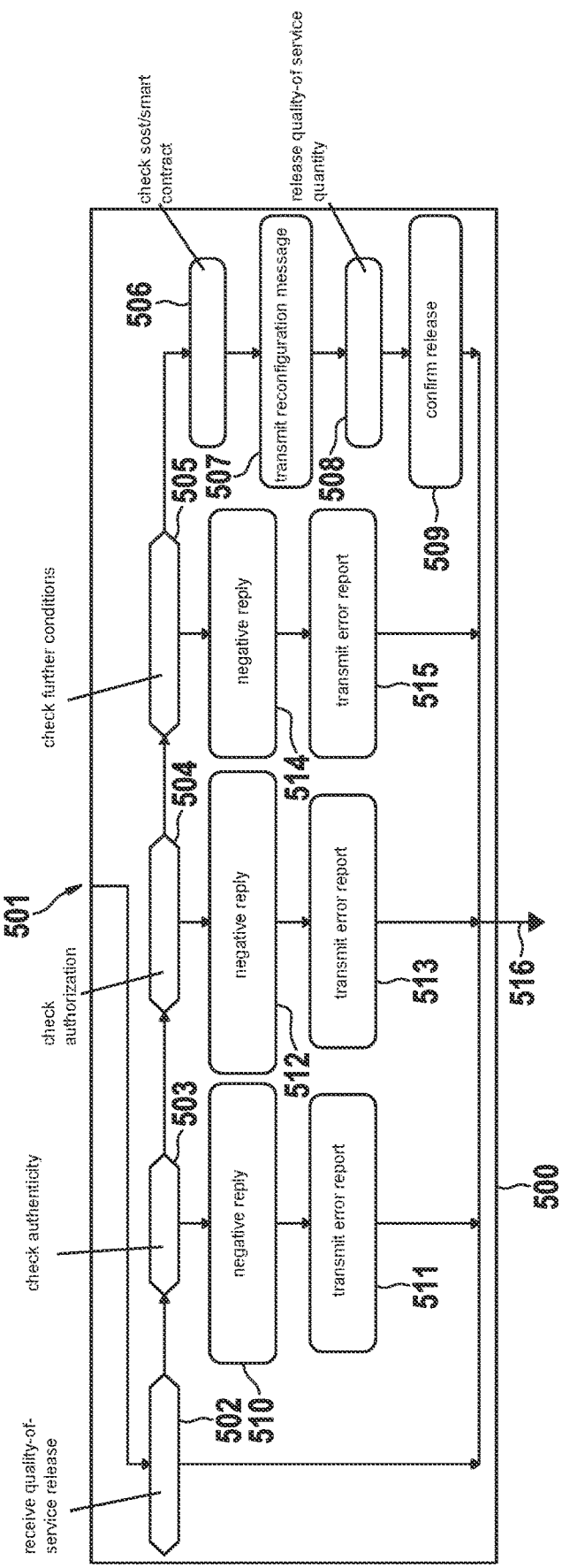
FIG. 5 shows the sequence of the method steps of the function block for a deregistration of a quality-of-service quantity from FIG. 3, according to an example embodiment of the present invention.
Figure 6:
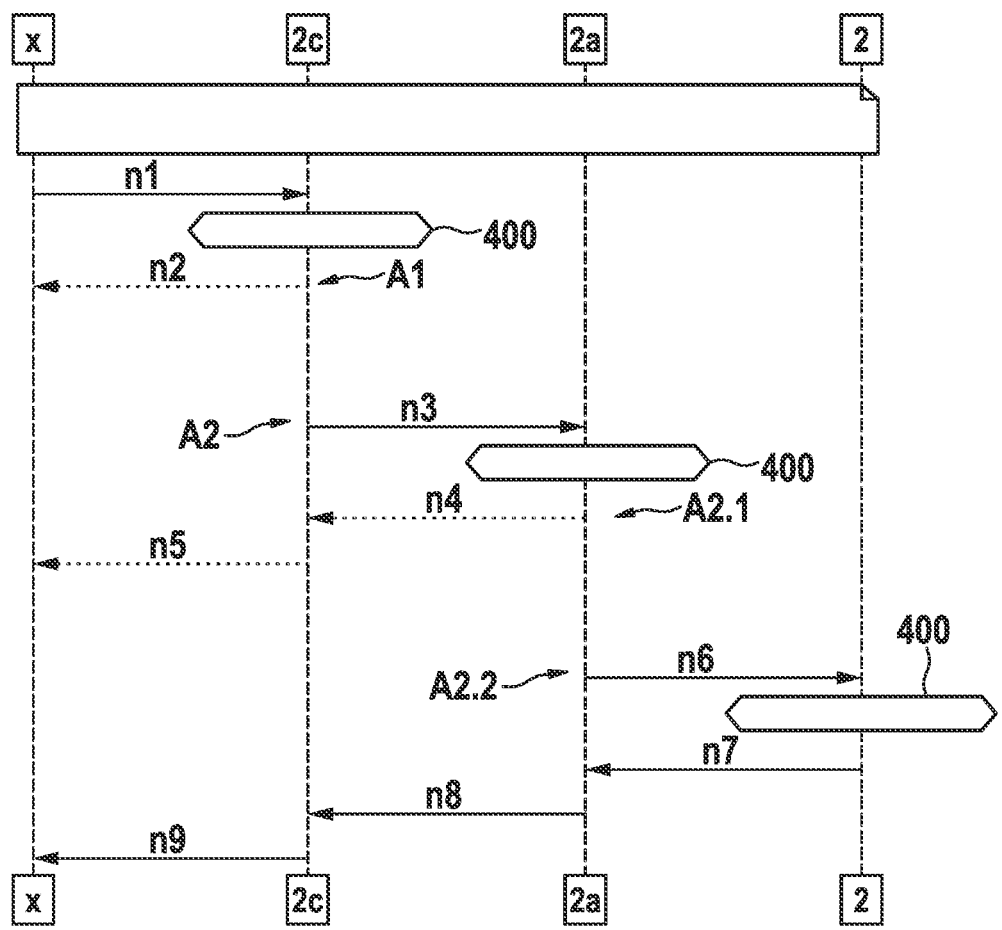
FIG. 6 schematically shows the communication between multiple gateways according to an advantageous embodiment of the method of the present invention.

In an advantageous manner, a network segment may also be formed by an infrastructure component or software component. It should be assumed in the present example that network segment 5 is developed as a hypervisor on which virtual machines, for example, define a separate network segment 6, 7 in each case. In particular, a gateway 2a is developed as part of the hypervisor, and each virtual machine 6 and 7 in turn has its own gateway 2b and 2c. Network segment 8 may involve a further partition, a virtual machine, a container runtime environment or something similar, which—as explained—may also be linked via a separate gateway. With reference to FIGS. 4 to 6, a preferred embodiment of a method according to the present invention will be described in the following text. FIG. 4 shows steps that are executed in order to register or update a gateway at a gateway in the stage situated below, whereas FIG. 5 shows steps for a deregistration In FIG. 4, a block 400 having an input 401 and an output 422 is shown, which includes a number of method steps 402 to 421. These method steps are executed during the configuration of quality-of-service quantities, e.g., in network 10 according to FIG. 3, when a requesting network subscriber outputs a quality-of-service request to the gateway to which it is logically connected.

In a step 402, an addressed gateway receives a quality-of-service request from the requesting network subscriber such as a software component or a superposed gateway. As illustrated, this step 402 may preferably also include a check whether the quality-of-service request satisfies certain validity prerequisites. If this is the case, the method continues with a step 403, and in the other case (branch x), the block is left at 422.

The conditions optionally to be checked may particularly be the check of a basic data format of the quality-of-service request.

In a likewise optional step 403, an authenticity of the requesting network subscriber is able to be checked, i.e., specifically whether the quality-of-service request did indeed come from the network subscriber indicated as the requesting network subscriber in the quality-of-service request. This may be accomplished with the aid of authentication methods from the related art, for instance based on certificates or asymmetrical keys. If the authenticity of the requesting network subscriber is confirmed, then the method continues with step 404, and otherwise (branch x), with step 412.

In step 412, a negative reply is returned to the requesting network subscriber. In a further, optional next step 413, for instance, an error report may be sent, an error protocol be prepared, etc. before block 400 is left at 422.

In a likewise optional step 404, the authorization of the requesting network subscriber is checked, that is, in particular whether the requesting network subscriber is authorized to make a quality-of-service request to the addressed gateway. For this purpose, for instance, what is known as a whitelist or blacklist, which includes authorized and unauthorized network subscribers, may be stored in each gateway. If the authorization is given, the method will continue with step 405, and otherwise (branch x), with step 414.

In step 414, a negative reply is transmitted back to the requesting network subscriber. In a further, optional next step 415, for example, an error report may be sent, an error protocol prepared, etc., before block 400 is left at 422.

In step 405, it is checked in the addressed gateway whether a sufficient free quality-of-service quantity is available to satisfy the quality-of-service request. Each gateway especially has only a limited capacity or limited quality-of-service quantity for the forwarding of data at its disposal, which will be depleted at some point in time, depending on the already registered quality-of-service requests. If a sufficient quality-of-service quantity is available to satisfy the quality-of-service request, the method will continue with step 406, and otherwise (branch x), with step 416.

In step 416, a negative reply is transmitted to the requesting network subscriber. In a further, optional next step 417, for example, an error report may be sent, an error protocol be prepared, etc., before block 400 is left at 422.

In step 408, the registration or update is accepted, and in a step 409, the requested quality-of-service quantity is assigned to the requesting network subscriber. This quality-of-service quantity is therefore no longer available for later quality-of-service requests.

In a step 410, a reconfiguration message (RCM) is output, and the successful registration is confirmed in a step 411 by a positive reply to the requesting network subscriber. The block is then left at 422.

Additional optional steps 406 and/or 407 may be provided between steps 405 and 408. For instance, it may be provided in the network that a quality-of-service request be linked to certain costs. The type of cost is freely selectable and can be mapped by so-called cost functions. It is also possible to check whether a valid, so-called 'smart contract' exists. A smart contract is to be understood as a computer program or a computer protocol, which describes (e.g., as a logic mapping in a data structure), and/or checks (e.g., with the aid of conditions and logical linkages to other data structures) contracts and/or carries out the contract execution or contract implementation in a (partially) automated manner (for instance by triggering an action, executing a computer program, preparing/modifying a data structure, etc.). Smart contracts are able to be stored and/or executed with the aid of distributed ledger technologies (e.g., blockchain) or other trustworthy data structures. A smart contract may also describe a non-monetary exchange, e.g., of data and/or quality-of-service resource reservations. In the case of the smart contract, the step of checking is also to be understood as a modification of states and/or conditions mapped in the smart contract, e.g., the activation of contract execution functions mapped in the smart contract.

If the applicable essential prerequisites have been satisfied (e.g., if a sufficient budget is available for the costs, then a valid smart contract exists, etc.), the method continues with step 407, and in the other case (branch x), with step 418.

In step 418, a negative reply is returned to the requesting network subscriber. In a further optional next step 419, for instance, an error report may be sent, an error protocol prepared, etc. before block 400 is left at 422.

In a likewise optional step 407, further conditions are able to be checked, in particular with regard to the network topology, such as whether the requesting gateway did not already establish a connection or whether it has further connections so that a loop in the network could develop which would interfere with the logic tree structure. Conventional methods such as topology detection protocols, e.g., spanning tree, rapid spanning tree, etc. exist for this purpose. As an alternative, a logically centralized entity (SDN controller, orchestrator, or similar) may provide this topology information. If the conditions are satisfied, the method continues with step 408, and otherwise (branch x), with step 420.

In step 420, a negative reply is returned to the requesting network subscriber. In a further optional next step 421, for example, an error report may be transmitted, an error protocol be prepared, etc., before block 400 is left at 422.

As soon as a gateway receives a quality-of-service request for the first time (such as from a software component or some other gateway), it transmits this quality-of-service request as a requesting network subscriber to the gateway situated below. Later quality-of-service requests are transmitted in the form of an update, in which case a sum request for all requests made in total by the requesting gateway is typically made.

FIG. 5 illustrates a block 500 having an input 501 and an output 516, which includes a number of method steps 502 to 515. These method steps are carried out in network 10 according to FIG. 3, for example, if a quality-of-service quantity is to be released in full or in part or if a requesting network subscriber unregisters from the gateway to which it is logically connected.

In a step 502, an addressed gateway receives a quality-of-service release (with a quality-of-service quantity to be released) from the requesting network subscriber. This step 502, as illustrated, may preferably also include a check whether the quality-of-service release satisfies certain validity preconditions. If this is the case, then the method continues with a step 503, and in the other case (branch x), the block is left at 516.

The conditions optionally to be checked may particularly involve the check of a basic data format of the quality-of-service release.

In a likewise optional step 503, an authenticity of the requesting network subscriber is able to be checked, i.e., especially whether the quality-of-service release actually comes from the network subscriber indicated as the requesting network subscriber in the quality-of-service release. This may be done using authentication methods from the related art such as based on certificates or asymmetrical keys. If the authenticity of the requesting network subscriber is confirmed, the method continues with step 504, and otherwise (branch x), with step 510.

In step 510, a negative reply is transmitted back to the requesting network subscriber. This especially makes it possible to prevent what is known as DoS (Denial of Service) attacks. In a further optional next step 511, for instance, an error report is able to be transmitted, an error report be prepared, etc., before block 500 is left at 516.

In an also optional step 504, the authorization of the requesting network subscriber is checked, i.e., especially whether the requesting network subscriber is authorized to make a quality-of-service release to the addressed gateway.

For example, a so-called whitelist or blacklist of authorized or unauthorized network subscribers may be stored in each gateway for this purpose. If the authorization is given, then the method continues with step 505, and in the other case (branch x), the method continues with step 512. It may be provided, for example, that certain quality-of-service requests may not be released at all.

In step 512, a negative reply is returned to the requesting network subscriber. In a further, optional next step 513, it is possible, for instance, to transmit an error report, prepare an error protocol, etc., before block 500 is left at 516.

In an also optional step 505, it is possible to check further conditions, in particular with regard to the network topology such as whether other network subscribers would be cut off by the deregistration, for instance. If the conditions are satisfied, then the quality-of-service release is accepted and the method continues with step 506, and in the other case (branch x), the method continues with step 514.

In step 514, a negative reply is returned to the requesting network subscriber. In a further optional next step 515, it is possible, for instance, to send an error report, prepare an error protocol, etc. before block 500 is left at 516.

In an optional step 506, a cost accounting which possibly takes place and/or a smart contract is/are terminated. In the case of the smart contract, a "termination" is also to be understood as a modification of states and/or execution conditions mapped in the smart contract.

In a step 507, a reconfiguration message (RCM) is transmitted, and in a step 508, the no longer requested quality-of-service quantity is released. Therefore, this quality-of-service quantity is available for later other quality-of-service requests.

In a step 509, the successful quality-of-service release is confirmed by a positive reply to the requesting network subscriber. The block is subsequently left at 516.

In FIG. 6, a chronological sequence of different steps according to a preferred embodiment of the present invention is shown, and in particular a sequence for the registration with the aid of steps 400 according to FIG. 4 is described in greater detail.

The steps are sorted chronologically from top to bottom, the steps executed by the different network subscribers being shown in individual columns from left to right. x denotes a random network subscriber above gateway 2c in network segment 7, by which a software component, in particular, is encompassed. Columns 2, 2a and 2c are assigned to the corresponding gateways in FIG. 3.

To begin with, a quality-of-service request is made by subscriber x to gateway 2c in a step or by a message n1. This quality-of-service request is received in gateway 2c and processed according to block 400 described in FIG. 4. In the resulting feedback, two alternatives may be distinguished, which are denoted by the branches A1 and A2 in FIG. 6.

According to a first alternative A1, the requested quality-of-service quantity is available in gateway 2c and already registered in gateway 2a situated below. For instance, this relates to cases in which a gateway has requested quality-of-service quantities already ahead of time from the gateway situated below or in which the quality-of-service quantities in gateway 2c were already released by other requesting network subscribers but this release had not yet been forwarded to gateway 2a situated below. For example, it may be provided to first collect quality-of-services releases and then to release them at a later time in order to reduce network traffic and corresponding gateway configurations, for instance.

In this first alternative, the quality-of-service request may thus be confirmed in a step or by a message n2.

According to a second alternative A2, the requested quality-of-service quantity has not yet been requested in gateway 2a situated below so that the quality-of-service request is forwarded to gateway 2a in a step or by a message n3. Next, the quality-of-service request is received in gateway 2a and processed according to block 400 described in FIG. 4.

Next, two alternatives result again, where according to alternative A2.1, gateway 2a has already requested a sufficient quality-of-service quantity from gateway 2 situated below, and according to alternative A2.2, the requested quality-of-service quantity has not yet been requested from gateway 2 situated below.

According to alternative A2.1, gateway 2a may accept the quality-of-service request and confirm it in a step or by a message n4 to gateway 2c, which in turn accepts the quality-of-service request and in a step or by a message n5, confirms it to gateway 15.

According to alternative A2.2, the quality-of-service request is forwarded to gateway 2 in a step or by a message n6, where it will then be processed according to block 400 described in FIG. 4. The positive or negative reply (ok/nok) resulting from the check is transmitted in a step or by a message n7 from gateway 2 to gateway 2a, transmitted in a step or by a message n8 from gateway 2a to gateway 2c, and transmitted in a step or by a message n9 from gateway 2c to requesting subscriber x. That concludes the processing of the quality-of-service request.

The described steps particularly take place when the network subscriber (such as a software component) x is either started up for the first time or is meant to receive additional (or also fewer) QoS or resource reservations for other reasons (e.g., an activation, a function change, an update, another operating mode, etc.). To this end, x transmits message n1. N1 includes a data structure, which encompasses a description of the resource requests. These are generally conventional to one skilled in the art. Examples of QoS properties that can be requested are described above.

As an alternative, the message is also able to be transmitted by a logically centralized administration entity, e.g., an SDN controller, an orchestrator, a hypervisor or also a vehicle-external system. However, it is advantageous for the autonomy/system stability if the affected network subscriber transmits the message on its own.

What is claimed is:

1. A method for configuring managing a plurality of quality-of-service requests in a network having a first network segment and multiple second network segments, each of the multiple second network segments having one or more respective network subscribers, the first network segment has a first gateway, and each of the multiple second network segments has a respective second gateway, each respective one of the first and second gateways making a respective quality-of-service quantity available to the one or more respective subscribers of the respective gateway for forwarding of data, wherein the second network segments are arranged in a hierarchical tree structure formed of a plurality of hierarchical levels from a lowest hierarchical level to a highest hierarchical level, such that (I) each respective one of the second gateways of a respective one of the second network segments that is arranged below the highest hierarchical level is able to directly receive respective ones of the quality-of-service requests from only (i) one of the second gateways in an immediately higher one of the hierarchical levels than the hierarchical level in which the respective second gateway is arranged and (ii) the one or more network subscribers that are (a) in the same hierarchical level as the respective second gateway and (b) of the second network segment of which the respective second gateway is a part and (II) each respective one of the second gateways of a respective one of the second network segments that is arranged above the lowest hierarchical level is able to directly send respective ones of the quality-of-service requests to any of the second gateways in an immediately lower one of the hierarchical levels than the hierarchical level in which the respective second gateway is arranged, the method comprising:

for a handling one of the second gateways that is in one of the hierarchical levels that is higher than the lowest hierarchical level and lower than the highest hierarchical level:

receiving, by the handling second gateway, a first one of the quality-of-service requests directly from a requesting one of the second gateways that is in an immediately higher one of the hierarchical levels than the handling second gateway, wherein the handling second gateway is assigned a respective quality-of-service quantity (I) portions of which are assignable by the handling second gateway to respective ones of the plurality of quality-of-service requests and (II) an available remainder of which is diminished by each assignment of any of the portions to any of the plurality of quality-of-service requests;

in response to the receipt of the first quality-of-service request, checking whether the available remainder of the quality-of-service quantity that is assigned to the handling second gateway is sufficient to satisfy the first quality-of-service request;

in response to a result of the checking being that the available remainder of the quality of service quantity is not sufficient to satisfy the first quality-of-service request, responding to the requesting one of the second gateways with a rejection of the first quality-of-service request;

receiving, by the handling second gateway, a second one of the plurality of quality-of-service requests directly from the requesting one of the second gateways;

in response to the receipt of the second quality-of-service request, checking whether the available remainder of the quality-of-service quantity that is assigned to the handling second gateway is sufficient to satisfy the second quality-of-service request;

in response to a result of the checking being that the available remainder of the quality-of-service quantity is sufficient to satisfy the second quality-of-service request, forwarding the second quality-of-service request to a hierarchically lower one of the second gateways that is in the one of the hierarchical levels that is immediately below the handling second gateway;

receiving a reply from the hierarchically lower one of the second gateways indicating whether a sufficient quality-of-service quantity is available to satisfy the second quality-of-service request; and forwarding the received reply to the requesting one of the second gateways; and based on satisfaction of a condition that the indication of the reply is that the sufficient quality-of-service quantity is available to satisfy the second quality-of-service request, assigning a requested quality-of-service quantity of the second quality-of-service request to a requesting one of the network subscribers on behalf of which the second quality-of-service request was sent by the requesting one of the second gateways to the handling second gateway.

2. The method as recited in claim 1, wherein the forwarding of the second quality-of-service request is performed conditional upon the result of the checking being that the available remainder of the quality-of-service quantity is sufficient to satisfy the second quality-of-service request.

3. The method as recited in claim 1, wherein the forwarding of the second quality-of-service request is performed conditional upon that the handling second gateway has not yet received a reply to the second quality-of-service request.

4. The method as recited in claim 1, further comprising a check of further conditions with regard to a network topology prior to the allocating.

5. The method as recited in claim 1, further comprising an execution of further steps including a cost accounting or a smart contract when there is the satisfaction of the condition that the indication of the reply is that the sufficient quality-of-service quantity is available to satisfy the second quality-of-service request.

6. The method as recited in claim 1, further comprising:
    receiving, by the handling second gateway, a quality-of-service release of the requesting one of the network subscribers; and
    releasing the quality-of-service quantity that was assigned to the requesting one of the network subscribers in accordance with the quality-of-service release.

7. The method as recited in claim 6, further comprising:
    forwarding the quality-of-service release to the hierarchically lower one of the second gateways.

8. The method as recited in claim 6, further comprising an execution of further steps including a termination of a cost accounting or a smart contract, after the handling second gateway receives the quality-of-service release from the requesting one of the network subscribers.

9. The method as recited in claim 1, wherein the requesting one of the network subscribers is a gateway from the stage situated above or a data processing unit.

10. The method as recited in claim 1, wherein the first gateway is a safety gateway and the network segment features safety functions.

11. A processor for managing a plurality of quality-of-service requests in a network having a first network segment and multiple second network segments, each of the multiple second network segments having one or more respective network subscribers, the first network segment has a first gateway, and each of the multiple second network segments has a respective second gateway, each respective one of the first and second gateways making a respective quality-of-service quantity available to the one or more respective subscribers of the respective gateway for forwarding of data, wherein:

the second network segments are arranged in a hierarchical tree structure formed of a plurality of hierarchical levels from a lowest hierarchical level to a highest hierarchical level, such that:

(I) each respective one of the second gateways of a respective one of the second network segments that is arranged below the highest hierarchical level is able to directly receive respective ones of the quality-of-service requests from only:

(i) one of the second gateways in an immediately higher one of the hierarchical levels than the hierarchical level in which the respective second gateway is arranged; and (ii) the one or more network subscribers that are:
(a) in the same hierarchical level as the respective second gateway; and
(b) of the second network segment of which the respective second gateway is a part; and (II) each respective one of the second gateways of a respective one of the second network segments that is arranged above the lowest hierarchical level is able to directly send respective ones of the quality-of-service requests to any of the second gateways in an immediately lower one of the hierarchical levels than the hierarchical level in which the respective second gateway is arranged;

the processor is part of a handling one of the second gateways that is in one of the hierarchical levels that is higher than the lowest hierarchical level and lower than the highest hierarchical level, and is programmed to:

receive a first one of the quality-of-service requests directly from a requesting one of the second gateways that is in an immediately higher one of the hierarchical levels than the handling second gateway, wherein the handling second gateway is assigned a respective quality-of-service quantity (I) portions of which are assignable by the handling second gateway to respective ones of the plurality of quality-of-service requests and (II) an available remainder of which is diminished by each assignment of any of the portions to any of the plurality of quality-of-service requests;

in response to the receipt of the first quality-of-service request, check whether the available remainder of the quality-of-service quantity that is assigned to the handling second gateway is sufficient to satisfy the first quality-of-service request;

in response to a result of the checking being that the available remainder of the quality-of service quantity is not sufficient to satisfy the first quality-of-service request, respond to the requesting one of the second gateways with a rejection of the first quality-of-service request;

receive a second one of the plurality of quality-of-service requests directly from the requesting one of the second gateways;

in response to the receipt of the second quality-of-service request, check whether the available remainder of the quality-of-service quantity that is assigned to the handling second gateway is sufficient to satisfy the second quality-of-service request;

in response to a result of the checking being that the available remainder of the quality-of-service quantity is sufficient to satisfy the second quality-of-service request, forward the second quality-of-service request to a hierarchically lower one of the second gateways that is in the one of the hierarchical levels that is immediately below the handling second gateway;

receive a reply from the hierarchically lower one of the second gateways indicating whether a sufficient quality-of-service quantity is available to satisfy the second quality-of-service request;

forward the received reply to the requesting one of the second gateways; and based on satisfaction of a condition that the indication of the reply is that the sufficient quality-of-service quantity is available to satisfy the second quality-of-service request, assign a requested quality-of-service quantity of the second quality-of-service request for the second quality-of-service request.

12. A non-transitory machine-readable memory medium on which is stored a computer program that executable by a processor and that, when executed by the processor, causes the processor to perform a method for managing a plurality of configuring quality-of-service requests in a network having a first network segment and multiple second network segments, each of the multiple second network segments having one or more respective network subscribers, the first network segment has a first gateway, and each of the multiple second network segments has a respective second gateway, each respective one of the first and second gateways making a respective quality-of-service quantity available to the one or more respective subscribers of the respective gateway for forwarding of data, wherein the second network segments are arranged in a hierarchical tree structure formed of a plurality of hierarchical levels from a lowest hierarchical level to a highest hierarchical level, such that (I) each respective one of the second gateways of a respective one of the second network segments that is arranged below the highest hierarchical level is able to directly receive respective ones of the quality-of-service requests from only (i) one of the second gateways in an immediately higher one of the hierarchical levels than the hierarchical level in which the respective second gateway is arranged and (ii) the one or more network subscribers that are (a) in the same hierarchical level as the respective second gateway and (b) of the second network segment of which the respective second gateway is a part and (II) each respective one of the second gateways of a respective one of the second network segments that is arranged above the lowest hierarchical level is able to directly send respective ones of the quality-of-service requests to any of the second gateways in an immediately lower one of the hierarchical levels than the hierarchical level in which the respective second gateway is arranged, wherein the processor is part of a handling one of the second gateways that is in one of the hierarchical levels that is higher than the lowest hierarchical level and lower than the highest hierarchical level, and wherein the method includes the following steps:

receiving, by the handling second gateway, a first one of the quality-of-service requests directly from a requesting one of the second gateways that is in an immediately higher one of the hierarchical levels than the handling second gateway, wherein the handling second gateway is assigned a respective quality-of-service quantity (I) portions of which are assignable by the handling second gateway to respective ones of the plurality of quality-of-service requests and (II) an available remainder of which is diminished by each assignment of any of the portions to any of the plurality of quality-of-service requests;

in response to the receipt of the first quality-of-service request, checking whether the available remainder of the quality-of-service quantity that is assigned to the handling second gateway is sufficient to satisfy the first quality-of-service request;

in response to a result of the checking being that the available remainder of the quality-of service quantity is not sufficient to satisfy the first quality-of-service request, responding to the requesting one of the second gateways with a rejection of the first quality-of-service request;

receiving, by the handling second gateway, a second one of the plurality of quality-of-service requests directly from the requesting one of the second gateways;

in response to the receipt of the second quality-of-service request, checking whether the available remainder of the quality-of-service quantity that is assigned to the handling second gateway is sufficient to satisfy the second quality-of-service request;

in response to a result of the checking being that the available remainder of the quality-of-service quantity is sufficient to satisfy the second quality-of-service request, forwarding the second quality-of-service request to a hierarchically lower one of the second gateways that is in the one of the hierarchical levels that is immediately below the handling second gateway;

receiving a reply from the hierarchically lower one of the second gateways indicating whether a sufficient quality-of-service quantity is available to satisfy the second quality-of-service request;

forwarding the received reply to the requesting one of the second gateways; and based on satisfaction of a condition that the indication of the reply is that the sufficient quality-of-service quantity is available to satisfy the second quality-of-service request, assigning a requested quality-of-service quantity of the second quality-of-service request for the second quality-of-service request.

\* \* \* \* \*